Patented July 31, 1951

2,562,856

UNITED STATES PATENT OFFICE 2,562,856

MANUFACTURE OF ALKYLLEAD COMPOUNDS

George Calingaert, Geneva, N. Y., and Hymin Shapiro, Detroit, Mich., assignors to Ethyl Corporation, New York, N. Y., a corporation of Delaware No Drawing. Application July 27, 1950, Serial No. 176,252

5 Claims. (Cl. 260—437)

This invention relates to a new process for making alkyllead and aryllead compounds.

The most important of the alkyllead compounds is tetraethyllead which is made commercially by reacting monosodium-lead alloy with ethyl chloride in accordance with the following equation $$4NaPb + 4C_2H_5Cl \rightarrow (C_2H_5)_4Pb + 4NaCl + 3Pb$$

This process has been successful but it has certain disadvantages among which are the necessity of forming a sodium-lead alloy and the inherent limitations in yield since three-fourths of the lead is not utilized in the reaction. The unused lead must be recovered and realloyed with the sodium. The usual yield of tetraethyllead is about 22 weight per cent based on the lead.

One object of our invention is to provide a process for increasing the yield of tetraethyllead obtained in the present process. Another object is to provide a process using free lead, thus avoiding the expensive alloying operations.

The above objects are accomplished by reacting an alkylating or arylating agent with lead and a dialkyl or diaryl zinc compound. Our reaction can be generalized by the following equation $$Pb + 2RX + R_2Zn \rightarrow R_4Pb + ZnX_2$$

where R is an alkyl or an aryl radical and X is an inorganic acid radical which forms a salt with the zinc.

It should be noted that the theoretical yield of the organolead compound based on the lead is four times that of the present commercial process.

Any of the alkylating or arylating agents heretofore used or described in the prior art can be used, among which are the alkyl and aryl halides, preferably the iodides, bromides and chlorides, the dialkyl sulfates and the trialkyl phosphates. In general, the alkylating and arylating agents are esters of inorganic acids having the proper alkyl or aryl groups for making the desired organolead compound, and having an inorganic acid group which forms a salt with the zinc. Among those which can be used in our invention are methyl, ethyl, propyl, butyl and phenyl chlorides, as well as the corresponding bromides and iodides, diethyl sulfate and triethylphosphate.

Catalysts are important to our invention since they improve the yield. The preferred catalysts are the dialkyl ethers, such as dimethyl, diethyl and diisopropyl ethers. Also catalysts of the iodide type can be used, and in particular the organic iodides.

While tetraethyllead is the principal compound discussed herein because of its large commercial use, other organolead compounds, such as tetramethyllead, tetrapropyllead, dimethyldiethyllead, methyltriethyllead, tetraphenyllead and diethyldiphenyllead can be made by the process of our invention.

Various dialkyl or diaryl zincs can be used depending on the lead alkyl or aryl desired, such as the dimethyl, diethyl, dipropyl, dibutyl and diphenyl zincs. If the alkyl or aryl groups attached to zinc are different than the one attached to the alkylating or arylating agent, a mixture of organolead compounds usually results.

The temperature employed is not important, the preferable range being between 50° and 100° C. The pressure used is not critical but should be sufficient at the temperature employed to maintain the alkylating agent in the liquid phase. The time of reaction is between about 30 minutes and 5 hours. The amount of alkylating or arylating agent employed is not critical, but an excess over the stoichiometric amount required in the above general equation is preferred.

Our process can be used concurrently to improve the yield of the present commercial process or it can be used independently in treating the unreacted lead from the present process or other forms of free lead. By concurrently is meant either adding the diethyl zinc along with the other reactants to the present process, or first conducting the reaction of the present process and then adding the diethyl zinc together with additional ethyl chloride, if required. Such an overall reaction is expressed by the following illustrative equation $$4NaPb + 10RX + 3R_2Zn \rightarrow 4R_4Pb + 4NaX + 3ZnX_2$$

Also other metals well known for this purpose, can be alloyed with the lead in place of sodium and used in the above reaction. In general, such metals are selected from the alkali and alkaline earth metals, such as for example potassium, magnesium and calcium.

For best results a slight stoichiometric excess of the dialkylzinc should be used although lesser amounts give proportionate yields and will result in an increase in yield when used concurrently with the present process.

Our invention can be best understood by referring to the following working examples, wherein all parts and percentages are by weight.

*Example I*

Two-stage reaction using sodium-lead alloy and ethyl chloride: A charge of 100 parts of NaPb alloy is added to a reaction vessel, equipped with an agitator, a jacket for circulation of heating or cooling liquids, a reflux condenser, charging and discharging ports, liquid feed lines, and means for releasing the pressure. Liquid ethyl chloride in the amount of 112 parts is added under pressure to the stirred solids in the vessel over a period of one-half hour. By controlling the flow of liquid in the autoclave jacket and in the reflux condenser the temperature of the reaction mass is permitted to rise from an intial temperature of 50° C. to a temperature of 70° C. during this feed period. The pressure in the autoclave during this feed rises to 75 pounds per square inch gauge where it is maintained. The temperature of the stirred reaction mixture is maintained at 70° C. for an additional 15 minutes maintaining the 75 pound pressure. For the second stage, 271 parts of ethyl iodide, with which had been premixed 48 parts of ether and 80 parts of diethyl zinc, is added uniformly under pressure as a liquid to the autoclave over a period of 15 minutes, again maintaining the 75 pounds pressure. The temperature of the stirred reaction mass is maintained at 70° C., while maintaining 75 pounds pressure, for an additional 85 minutes. At the end of this period the pressure in the autoclave is reduced to atmospheric by venting for 15 minutes while the temperature is maintained at 70° C. For an additional 15 minute period at 70° C., nitrogen is passed over the reaction mass while the autoclave is open to the atmosphere. The mass is then cooled to 45° C., over an additional 30 minute period while flushing with a stream of nitrogen. The reaction mass is then discharged slowly to a steam-still containing 250 parts of water. With 100° C. steam fed to the jacket of the steam-still, a forecut of ethyl chloride and ether is taken, up to a vapor temperature of 70° C. At this point the steam jets are then turned on, and with the jacket steam off, the tetraethyllead is distilled for one and one-half hours after the first drop of tetraethyllead appears in the distillation receiver. The yield of products is 107.3 parts, or a yield of 76.4 per cent based on the lead present in the sodium-lead alloy.

Example II

One-stage reaction using lead recovered from the present commercial process: Using substantially the same operating procedure as the second stage of Example I, a one-stage modification is carried out with the variation that all the ethyl iodide, diethyl zinc and diethyl ether are added simultaneously to the system containing 100 parts of lead recovered from a reaction similar to the first stage of Example I. In this charge 100 parts of lead, 271 parts of ethyl iodide, 85.2 parts of diethyl zinc and 48 parts of ether are employed. The operations of cooking, venting, cooling, discharging and recovery of the product are conducted substantially as above. The yield of product was 98.6 parts, or 63.3 per cent based on the lead charged.

In a series of operations similar to Example II wherein the alkylating agent added in the second stage was 155 parts of methyl chloride or 266 parts of ethyl bromide, each employed with 57 parts of diethyl zinc and 36 parts of diethyl ether. The yields of alkyllead compound were 4.8 and 22.1 parts or 3.1 and 14.2 per cent respectively.

Example III

In a process similar to that described in Example II ethyl iodide in the amount of 382 parts and 28.5 parts of diethyl zinc were added to 100 parts of the lead. After reaction as above the yield of alkyllead product was 19.2 parts, or 12.3 per cent based on the lead charged.

Example IV

An operation similar to Example II was carried out wherein 100 parts of lead paste was substituted for the lead from the present commercial process. Ethyl iodide in the amount of 222 parts, 59.9 parts of diethyl zinc, and 55 parts of diethyl ether were added to the autoclave and reaction was conducted for one hour at a temperature of 70° C. The yield of alkyllead product was 70.3 parts or 45.1 per cent based on the amount of lead charged.

Example V

In an operation carried out in a manner similar to Example II wherein the diethyl zinc and additional ethyl chloride were added to the lead, the ether catalyst of Example II was augmented with 7.4 parts of ethyl iodide. The yield of alkyllead product from this operation was 13.7 parts or 8.8 per cent based on the lead charged in the first stage.

Other embodiments of this invention can be made without departing from the spirit and scope of our invention which is not limited to specific embodiments given herein.

We claim:

1. A process for making hydrocarbon-lead compounds comprising reacting lead with a reagent selected from the class consisting of arylating and alkylating agents which include the hydrocarbon radical in question and have a negative radical which reacts with zinc, and with a hydrocarbon-zinc compound in which the hydrocarbon radical is selected from the group consisting of alkyl or aryl.

2. A dual process for making tetraethyllead which comprises reacting a sodium-lead alloy with ethyl chloride, and reacting the free lead so-produced with ethyl chloride in the presence of diethyl zinc and diethyl ether.

3. The process of claim 1 in which the hydrocarbon-zinc compound is a dialkyl zinc.

4. The process of claim 1 for making tetraethyllead in which the alkylating agent is an ethylating agent and the hydrocarbon-zinc compound is diethyl zinc.

5. The process of claim 1 for making tetraethyllead in which the alkylating agent is ethyl chloride, the hydrocarbon-zinc compound is diethyl zinc and further the process is conducted in the presence of ethyl ether as a catalyst.

GEORGE CALINGAERT.
HYMIN SHAPIRO.

REFERENCES CITED

The following references are of record in the file of this patent:

Calingaert: Chemical Reviews, volume 2 (1925–6), page 49.